(12) United States Patent
Mäki

(10) Patent No.: US 6,787,169 B1
(45) Date of Patent: Sep. 7, 2004

(54) PHYSIOLOGICAL FOOD SALT PRODUCT

(76) Inventor: Juhani Mäki, Vanha Pälkäneentie 157, FIN-36570 Kaivanto (FI)

( * ) Notice: Subject to any disclaimer, the term of this patent is extended or adjusted under 35 U.S.C. 154(b) by 0 days.

(21) Appl. No.: 09/889,743

(22) PCT Filed: Jan. 12, 2000

(86) PCT No.: PCT/FI00/00018
§ 371 (c)(1),
(2), (4) Date: Jul. 20, 2001

(87) PCT Pub. No.: WO00/44245
PCT Pub. Date: Aug. 3, 2000

(30) Foreign Application Priority Data

Jan. 27, 1999 (FI) .................................................. 990145

(51) Int. Cl.$^7$ .......................... A23L 1/304; A23L 3/358
(52) U.S. Cl. ........................... 426/72; 426/74; 426/518; 426/519; 426/649
(58) Field of Search ........................... 426/72, 74, 518, 426/519, 649

(56) References Cited

U.S. PATENT DOCUMENTS 2,471,144 A * 5/1949 Davy .......................... 426/649
3,860,732 A * 1/1975 Eisenstadt .................... 426/649

FOREIGN PATENT DOCUMENTS

| DE | 1567937 | 10/1970 |
| FI | 961229 | 9/1997 |
| GB | 351845 | 7/1931 |
| WO | 88/09131 | 12/1988 |
| WO | 90/00522 | 1/1990 |
| WO | 98/32343 | 7/1998 |

OTHER PUBLICATIONS

Derwent accession No. 1981–50875D, Toa Gosei Chem Ind Ltd, Composition for Maintaining Food Freshness—Contains Oxygen Absorbent, Hygroscopic or Deliquescent Alkaline Earth Metal Salt and Bi:carbonate, JP,A,56061981, 1981057.

Derwent accession No. 1972–78346T, Tokuyama Soda KK, Anhydrous Magnesium Chloride Produce Ammonium Chloride Magnesium Hydroxide, JP,A,47027195, DW197249.

* cited by examiner

Primary Examiner—Helen Pratt
(74) Attorney, Agent, or Firm—Venable LLP; Eric J. Franklin

(57) ABSTRACT

The invention relates to a physiological food salt product which consists primarily of minerals and contains hydrate forms of an alkaline earth metal ammonium chloride to control the taste, hygroscopic properties and physiological nutritional properties of the product. The invention also relates to the use of the product.

19 Claims, 2 Drawing Sheets

PHYSIOLEGICAL FOOD SALT PRODUCT

Figure 1:
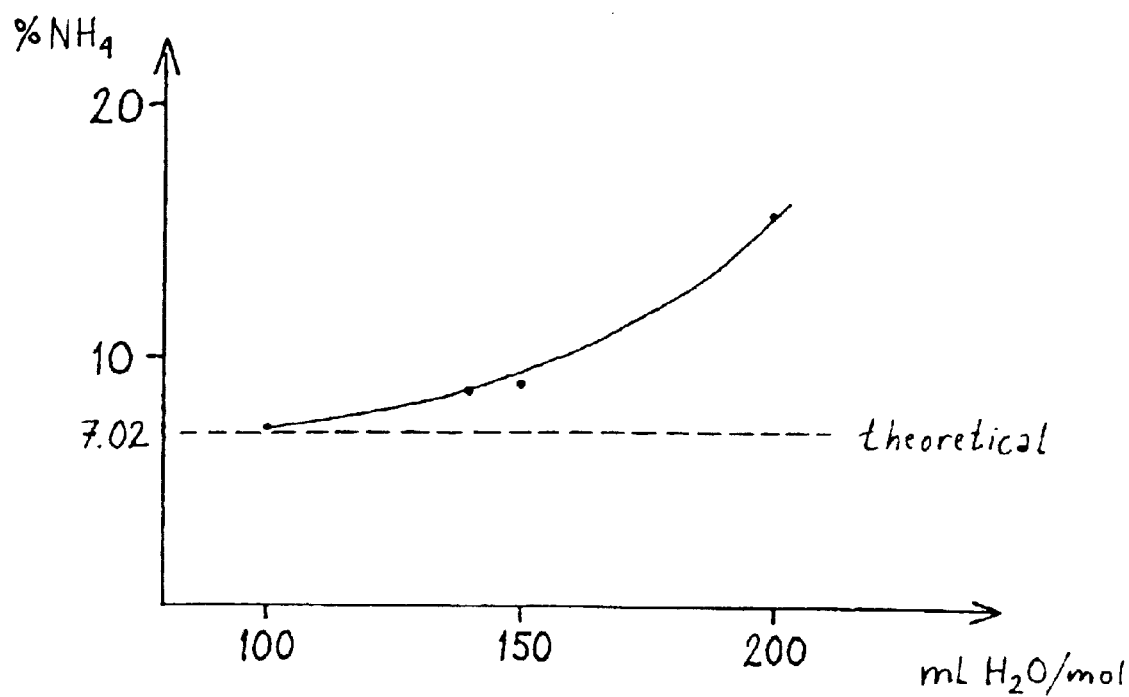

The present invention relates to a physiological food salt product which primarily consists of minerals and in whose formulation an alkaline earth metal component or components are brought to an appropriate form with acceptable taste and hygroscopic properties. The invention also relates to the use of a salt product prepared according to the method.

In the preparation, preservation or seasoning of foods in a variety of cases, with respect to the use of food salt products, it is presently an important aim to avoid excessive inclusion of common salt, i.e. sodium chloride, NaCl, in the formulation of the food product. The reason for this attempt is the clearly documented harmful effect of NaCl on human health. When the daily consumption of NaCl by a person in the Western countries is estimated to be 170 meq (9.9 g), morbidity on arterial hypertension and mortality on myocardial infarction are common even with daily intake of 100 meq (5.8 g). When the daily dose is less than 50 meq (2.9 g), morbidity is indicated to be low. Consequently, the above-mentioned value 50 meq per day can be considered the recommended maximum daily intake of NaCl.

It has been found in different cases that a daily intake of magnesium, Mg, reduces blood pressure. The recommended dietary allowance (RDA) indicated for magnesium is 4.5 mg/kg/day, resulting in calculated values of 350 to 400 mg per day for adult male population and 280 to 300 mg per day for women, correspondingly. For the above-mentioned reasons, there is a strong need to develop a substitute or modification for common salt, which will fulfill not only the physiological recommended values but also other requirements, such as taste and good sprinklability in its most common form of usage.

The RDA value for calcium, Ca, is indicated to be 800 to 1200 mg per day for adult population. Although the supply of calcium is often sufficient, particularly when the diet is based on milk products, it can be considered appropriate to include calcium in table salt, for example due to an increased need of Ca during pregnancy or during adolescence.

To combine physiologically sufficient alkaline earth contents with food salt formulations has been problematic in practice, primarily because other salts than chlorides (sulphates, phosphates, carbonates, etc.) can hardly be used because of their physiological unsuitability, bitter taste and/or poor solubility.

When alkaline earth metal chlorides are added to food salt in connection with the preparation process, one must, however, solve in a satisfactory manner their strong hygroscopicity, which means the tendency of deliquescence of the product under the effect of humidity in the air. Furthermore, the taste of these chlorides is pungently salty and thus too different from the taste of NaCl.

The same properties apply to carnallite, $MgCl_2 \times KCl \times 6H_2O$, present in natural salt deposits which normally contains such quantities of coprecipitated bromides that its nutritional use as such is out of question.

Upon studying the prior art related to the invention, it is found that the development of table salt products has recently been focused on products containing potassium, K, or potassium and magnesium, K and Mg, whereby the main purpose is to reduce the intake of sodium, Na, in food, the main criteria for commercial utilization being acceptable taste. Consequently, methods have been introduced to prepare such mixtures of NaCl, KCl and $MgCl_2$ in which $MgCl_2$ or its potassium double salt imitating the natural carnallite is protected from air humidity by means of alkali metal chlorides. Two patent applications that are close to these subjects should be mentioned, WO A1 92/16117 (A23L 1/237) and WO A1 92/18668 (A23L 1/237). Of these, the former presents a method for coating the hygroscopic component of the salt with a non-hygroscopic material. The latter patent application presents a method for treatment of NaCl-K/Mg salts, which method comprises quick drying of the solution prepared of the salts and is intended for producing a stable multi-component salt mixture.

Patent application WO 90/00522 (A23L 1/237) describes a synthetic method for preparing a salt which imitates carnallite for a food salt product by evaporating a solution which contains potassium chloride and magnesium chloride in equivalent ratios and by heat treatment of the obtained evaporation residue to stabilize the product. However, it is industrially impractical to remove scale deposits from the evaporating apparatus, and the method cannot thus be realized as a continuous process. Moreover, it has been found in check-up studies relating to the method that a dried evaporation residue obtained with e.g. a rotatory evaporator is as hygroscopic as natural carnallite, and that as a result of the heat treatment, hydrochloric acid is emitted from the product, which results in that the solubility of the product to water, the pH of the solution, and thereby its taste are changed to the adverse direction.

Aalso patent application WO 88/09131 (A23L 1/237) should be mentioned as related to the invention. The application presents a salt substitute which contains 50% of free ammonium chloride $NH_4Cl$ admixed mechanically to phosphates and sugar which adjust the acidity of the 20 product. Continuous use of the product according to the formulation may, however, be physiologically doubtful, because the calculatory ammonium content will thus rise to a level of 16.8%.

Furthermore, as prior art connected with the invention, two Finnish patent applications should be mentioned, No. 961229 and No. 970323, as well as international application WO 98/32343 (A23L 1/237) related to the latter, in which, to eliminate the hygroscopicity, an amino acid complex is formed from alkaline earth chlorides, particularly with glycine, which is also the simplest amino acid. However, a closer study of the technique presented in the patents has revealed that the aims of the patents cannot be achieved to the described extent, for the following reasons.

For example, $MgCl_2 \times 6H_2O$ forms three different complexes with glycine, which have been found to be in a balance with each other according to the following equation:

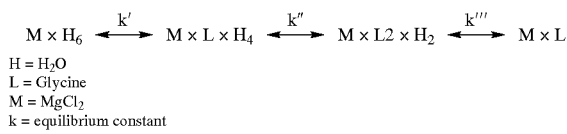

H = H$_2$O
L = Glycine
M = MgCl$_2$
k = equilibrium constant

For example, a compound prepared with equivalent ratios of $MgCl_2$ and glycine is thus normally a mixture which does not fulfill the criterion of hygroscopicity at high air humidity values. Moreover, it is not possible to isolate amino acid complexes from a concentrated solution by centrifugation, but the solution must be fully evaporated, which complicates industrial production. Furthermore, it seems that adverse changes take place in the taste and colour of the final product even in a short time interval, possibly due to oxidation of the organic component.

In any case, none of the products according to any of the above-mentioned applications fulfills all the requirements set above for the invention. The same applies to commercially available Na-K-Mg table salts, examples of which include the almost identical products Seltine® and Pan Salt® whose composition comprises the compounds NaCl, KCl and $MgSO_4 \times 7H_2O$ (12%) in a mechanical mixture. When the intake of magnesium is calculated from e.g. the above-mentioned commercial products with an average daily use of 7.5 g, the daily dose obtained for magnesium is 88 mg, which is fully insufficient in view of the above-mentioned recommended values. In these products, the hygroscopic properties are under control, but it has not been possible to eliminate the disadvantages of the sulphate, of which an increased excretion of calcium possibly caused by the sulphate ion should be mentioned. Furthermore, analyses of the compositions of both products have revealed $MgSO_4$ contents differing from the given values, which may be primarily due to the fact that this salt has a different crystalline form and density than the alkali metal chlorides, which results in the separation of magnesium sulphate from the mixture.

It is disclosed in prior art that ammonium carnallite type compounds of alkaline earth metals, particularly the corresponding magnesium salt, have been used for preparing anhydrous alkaline earth chlorides by a pyrolytic method for technical purposes, of which the most important is the electrolytic preparation of magnesium metal from $MgCl_2$ melt in a process which is now outdated (British patent 351 845 from the year 1931 and German Offenlegungsschrift 1 567 937 from the year 1970). The uses in question do not, however, fall into the category of the present application, and the patent publications in question do not discuss the hygroscopic properties of the prepared products.

The purpose of the invention is to introduce a method, by which it is possible to eliminate the above-mentioned drawbacks related to the preparation of food salts and to make a product containing the desired ions, particularly alkaline earth metal chlorides, which fulfills the requirement of sufficiently low hygroscopicity as well as makes it possible to achieve the objectives related to the taste and nutritional properties set for the salt product.

To achieve the above-mentioned aims, the invention is primarily characterized in what will be presented in the characterizing part of the appended claim 1. By means of ammonium chloride salts of the alkaline earth metals Mg and Ca, it is possible to produce a nutritional salt product which contains the desired ions but whose physical properties are also suitable for practical applications.

The method of the invention for preparing physiological food salts is based on the surprising finding that when ammonium chloride is added into substantially concentrated solutions, normally aqueous solutions, which contain alkaline earth metal chloride or chlorides, and can preferably also contain potassium chloride and possible other components and/or micronutrients affecting primarily the taste, it is possible to obtain, particularly in the presence of magnesium chloride, carnallite-type crystalline precipitations which fulfill the above-mentioned requirements relating to low hygroscopicity and the taste. Furthermore, the taste, primarily the acidity, of the obtained carnallite-type salts can be influenced preferably by changing the pH value of the mother liquor with bases, preferably ammonia, and/or by treating the product separated from the mother liquor at suitably selected temperatures.

With reference to the invention, it has been surprisingly found that ammonium carnallite, whose formula can be given either as $MgCl_2 \times NH_4Cl \times 6H_2O$ or $MgNH_4Cl_3 \times 6H_2O$, has the particular property to co-precipitate hygroscopic chlorides, such as calcium, chloride $CaCl_2$ or potassium carnallite $MgKCl_3 \times 6H_2O$ from the mother liquor to mixed crystal forms which have no hygroscopicity or in which the property is substantially suppressed.

The use and modification of ammonium chloride hydrates of alkaline earth metals in the above-described manner to prepare the present physiological food salt product and to control its properties is not disclosed in the prior art. It is thus a new inventive idea.

The inclusion of hygroscopic alkaline earth metal chlorides or their double salts, such as potassium carnallite, in sprinklable food salt products has been previously difficult or almost impossible. These impediments can be eliminated by forming a crystalline ammonium chloride adduct from the salts.

Figure 3:
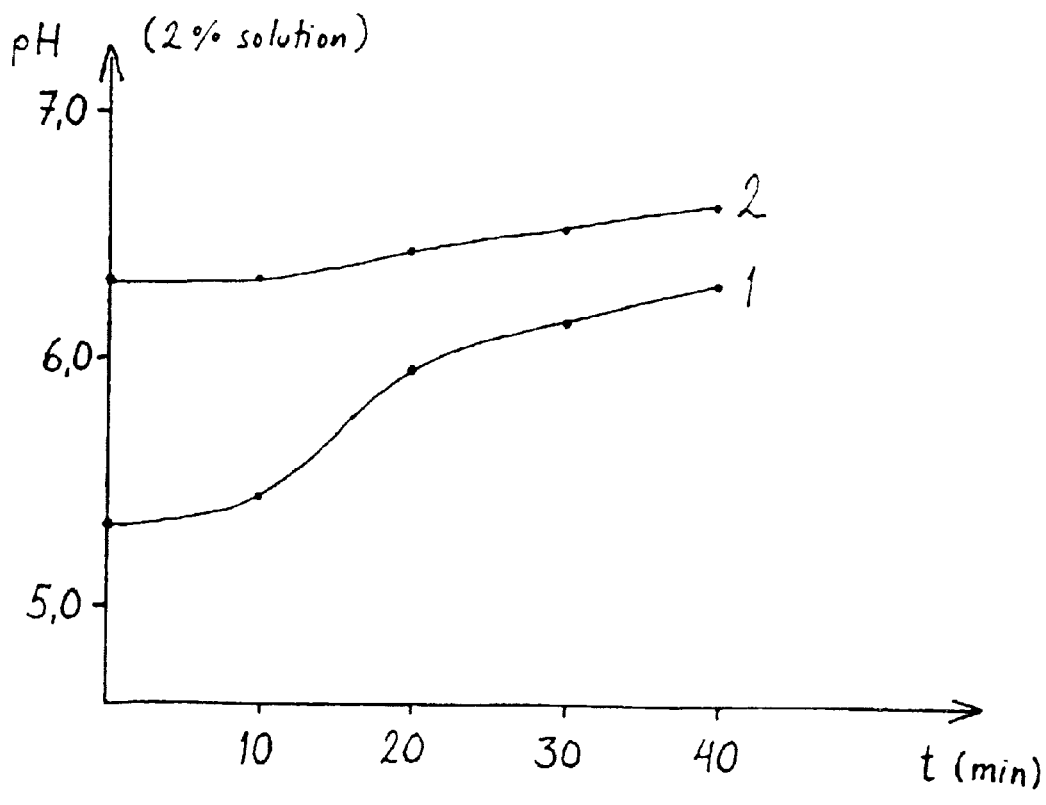
Figure 2:
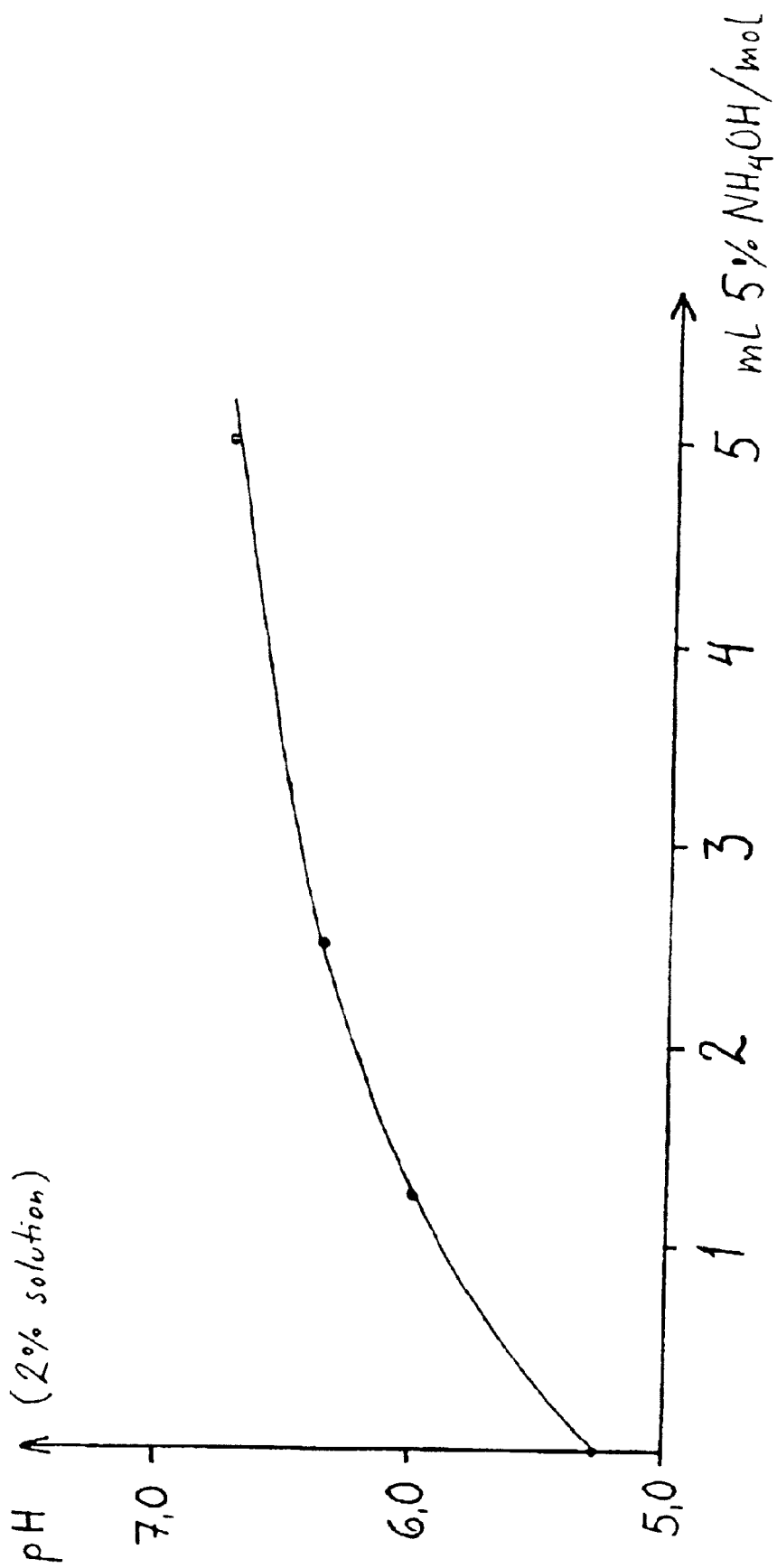

In the following, the invention and the related technique will be described in more detail with reference to the appended graphs, in which FIG. 1 shows the dependence of $NH_4$ content in ammonium carnallite, used as an exemplary product, on the quantity of water used for preparing the mother liquor, FIG. 2 shows the dependence of pH value of ammonium carnallite, used as an exemplary product, on the quantity of 5% ammonium hydroxide added per mole in the mother liquor, and FIG. 3 shows the effect of heat treatment on the pH value of two ammonium carnallite products prepared by different methods, as a function of time.

The following is a more detailed description on the properties of food salt components containing alkaline earth metals, relating to the invention, as well as on the preparing technique related to the invention.

In studies related to the invention, it has been surprisingly found that ammonium carnallite is, depending on the preparing method, extremely little or not at all hygroscopic and resembles e.g. potassium chloride in this respect. The taste of ammonium carnallite is close to the taste of alkali metal chlorides, particularly when the pH of its aqueous solution is arranged close to the pH value of alkali metal chlorides by means of the preparing technique related to the invention. Thus, magnesium double salts related to the invention can be easily added to food salt formulations in such contents that the above-mentioned RDA value can be achieved. It should also be mentioned that thanks to its slightly acid taste, ammonium carnallite prepared under normal conditions is suitable as such or in a mixture with alkali metal chlorides for preparing certain foods, such as salted fish, which normally contains a dangerous quantity of sodium.

As already mentioned above, chlorides, hygroscopic as such, can be easily included in ammonium carnallite to obtain products containing valuable mineral components. Studies indicate that when ammonium carnallite is precipitated from a solution which contains calcium chloride in adjusted ratios, such as in mole ratios of 1/0.1–0.2 of $MgCl_2/CaCl_2$, a non-hygroscopic salt component is obtained which is pleasant, supplements the taste of the salt product, and which can be used advantageously to make such physiological salt products in which it is desired to include calcium in the formulation.

Furthermore, it has been found that ammonia can be partly replaced by potassium. Thus, a food salt component found to have particular value is a mixed form of ammonium carnallite and potassium carnallite which, depending on the method of preparation, is close to the composition $2MgCl_2 \times KCl \times NH_4Cl \times 6H_2O$ and which can be preferably manufactured by adding potassium carnallite or, in corresponding ratios, magnesium chloride and potassium chloride, to a mother liquor containing ammonium chloride and magnesium chloride. The ratio of potassium and ammonium can be freely selected so that the desired hygroscopic properties are achieved for the product. The hygroscopicity will increase with an increase in the relative proportion of potassium. The carnallite mixtures in question contain exceptionally little ammonium chloride, for whose content in foodstuffs, primarily sweets, an upper limit has been imposed in some countries.

In the general formula of ammonium carnallite, Mg can be partly replaced with calcium, wherein the hygroscopicity will increase with an increase in the proportion of calcium. The general formula of the salt product is thus of the form $aMgCl_2 \times bCaCl_2 \times NH_4Cl \times XH_2O$, in which the sum of the coefficients a and b is close to the value 1. Consequently, for example a salt product which is made with the a and b values 0.5 and whose composition is $0,5 \ MgCl_2 \times 0,5 \ CaCl_2 \times NH_4Cl \times XH_2O$, and in which the effect of ammonium carnallite to protect from humidity is weaker, forms, depending on the relative humidity of air, a more or less moist crystalline mass which can, for example in view of the needs of food industry, be dosed in solid form and stored in open vessels without the product being fully deliquesced in the same way as calcium chloride. In this salt form, the content of ammonia is lower, due to the atomic weight of calcium, and the slight hygroscopic nature of the product is not harmful, taking into account the possible use of the product for water binding and seasoning purposes, normally in solution form in cheese and sausage industry and in processed meat industry. In this context, in view of food industry, it should be noted that the ammonium ion contained in the food salt components in question is, due to its slight acidity, detrimental to microbial action. Thus, if these salt products are used instead of sodium chloride, it is possible to reduce correspondingly the quantity of preservatives, for example detrimental nitrite used in sausage industry, and thereby to improve the quality of foodstuffs.

A salt form analogous to the structure of magnesium carnallite, calcium ammonium chloride, $CaNH_4Cl_3 \times 6H_2O$, which corresponds to the particular case a=0 and b=1 of the above-mentioned general structural formula, has excellent taste when compared with calcium chloride $CaCl_2$. The salt is stable when the humidity of air is low, but it has some hygroscopic nature when the humidity of air is high. It has been found that the hygroscopic nature of this salt can be eliminated by modifying it to an organic neutral complex, wherein suitable complexing agents, depending on the desired taste, include hydroxy acids and/or their salts or amino acids and/or their derivatives, preferably glycine. It has also been found that no such disadvantageous changes referring to the oxidation of glycine take place in the taste and colour of the final product, whose structural formula is normally $Gly \times CaNH_4Cl_3 \times H_2O$, which are present in ammonium-free alkaline earth metal complexes of glycine, with reference to the prior art described in Finnish patent applications No. 961229 and No. 970323 (WO 98/32343).

In tests related to the invention, it has been surprisingly found that the properties, such as acidity and thereby taste, of alkaline earth ammonium chlorides, particularly ammonium carnallite, are substantially dependent on the conditions of precipitation, particularly the concentration and pH of the mother liquor. The reason found for this phenomenon is the property of ammonium chloride to be prematurely crystallized from the mother liquor in the presence of slightly acidic salts, such as magnesium chloride, in the solution, which takes place to an increasing extent with an increase in the quantity of water used for the preparation of the mother liquor. Since even relatively small quantities of free ammonium chloride increase the acidity of the double salts, changing their taste to be slightly pungent, the above-mentioned salt product is thus preferably precipitated from a very concentrated solution, possibly under overpressure, wherein the content of free ammonium chloride remains low. The phenomenon is illustrated by means of an example in FIG. 1.

Furthermore, tests related to the invention have surprisingly shown that the acidity, and thereby the taste, of double salt components according to the invention can be substantially influenced by adding small quantities of a base, such as metal hydroxides, preferably ammonium hydroxide or potassium hydroxide, to the mother liquor. The acidity of the liquid can thus be reduced and its pH value be brought to a level at which premature crystallization of ammonium chloride from the mother liquor is prevented. Ammonium hydroxide is a particularly advantageous alkaline component, thanks to its volatility, but also because no such ions which would complicate the possible re-use of the filtrate will thus be added into the mother liquor. The phenomenon is illustrated graphically by means of an example in FIG. 2.

Furthermore, tests relating to the invention have also surprisingly shown that for example $MgNH_4Cl_3 \times 6H_2O$ or potassium and/or calcium containing mixed crystal forms of the compound which, treated within the temperature range from 90 to 140° C., lose a part, normally two of their six molecules of water of crystallization, are hydrated by the effect of air humidity to the original stable hexahydrate form whose pH, measured from the aqueous solution, is, depending on the temperature and the time of treatment, higher than the value of untreated material measured in a corresponding way. However, the pH change produced by the thermal treatment normally depends on the hermetic pH value of the product and thus on the method of preparing the product. The phenomenon is illustrated graphically by means of an example in FIG. 3.

It has been surprisingly found that ammonium carnallite, or mixed crystal forms containing the above compound, produce small quantities of hydrochloric acid HCl with crystal water during thermal treatment and, in a corresponding manner, ammonia $NH_3$ during a hydration sequence. Thus, the net effect is the discharge of possible coprecipitated ammonium chloride residues from the material, which has also been shown analytically and which also matches with minor weight losses caused by the thermal treatment.

In this context, it can be mentioned that for example the compound $MgNH_4Cl_3 \times 6H_2O$ is active in a microwave field only if it contains residual moisture. The method can thus be used systematically for drying the products in question without causing changes in the composition of the product.

As the pH of the ammonium chloride used as a 2% solution in the tests was 4.53, it is obvious that possible residues of ammonium chloride have an effect on e.g. the taste of ammonium carnallite. Therefore, the above-described two methods for controlling the acidity of alkaline earth ammonium chlorides in connection with the preparation process have the primary aim to regulate the content of possible free ammonium chloride in the final product and, on the other hand, to have an advantageous effect on e.g. the crystal size, filtrability, drying properties, and taste of the product. The optimal pH is, however, determined according to the use of the product and the final salt formulation.

The hydrates which are formed as a result of the thermal treatment and in which the number of molecules of water of crystallization is less than six can be used as such for preparing food salts according to the invention. The hydrate form in question may be advantageous in view of transportation of large quantities of the salt product particularly under damp and warm conditions.

Furthermore, it should be stated that such ammonium chloride hydrates of alkaline earth metals, in which the number of molecules of water of crystallization is in the range from 0 to 3, are naturally encompassed by this invention. Their treatment is difficult because of the strong hygroscopic nature of the hydrate forms, and their preparation requires processing at relatively high temperatures, which causes energy consumption and thus additional costs.

In the preparation of the product of the invention, alkaline earth metal chlorides and ammonium chloride, and possibly potassium chloride or calcium chloride and a possible complexing component and possibly a desired quantity of a base, preferably ammonium hydroxide, are brought together as solutions, for example dissolved in water, possibly in equivalent mole ratios, preferably in a concentrated solution at an increased temperature, possibly under overpressure, after which the mixture is mixed to supplement the solubility and cooled at a desired rate to achieve a suitable crystal size. The separated crystal mass is filtered, dried and possibly processed at a temperature range from 90 to 140° C. to achieve a hydrate form having approximately four molecules of water of crystallization, is possibly hydrated and is used, as such or mixed with sodium chloride and/or potassium chloride, to prepare a food salt product having the desired ion composition.

According to a preferred method for preparing the product of the invention, a solution is prepared of magnesium chloride and/or calcium chloride in desired molar ratios, whereby, by mixing with ammonium chloride, a mixed crystal form precipitate is obtained which contains both mineral components as desired. To eliminate the possible hygroscopic nature of the product, the crystal mass is submitted to thermal treatment as described above.

According to a preferred method for preparing the product of the invention, to prepare the alkaline earth component or components for the product, a natural mineral which contains alkaline earth chloride or waste solutions from its processing, for example carnallite $MgCl_2 \times KCl \times 6H_2O$ or waste solutions from its processing, are used.

According to a preferred method for preparing the product of the invention, the affinity of ammonium chloride particularly to magnesium chloride is used, wherein the raw materials to be used can be e.g. magnesium chloride waste solutions from potassium chloride industry, normally originating from carnallite and possibly containing alkali bromides; natural deposits, such as carnallite deposits of the Dead Sea; or corresponding solutions which contain the desired mineral components in ratios corresponding to the desired product composition or which can, by suitable processing, made to correspond to the same.

In industrial methods for preparing the product of the invention, it is advantageous to use a continuous process in which e.g. an alkaline earth metal ammonium chloride hydrate, or its form containing potassium in addition to ammonium, is brought, after being separated e.g. by centrifugation, to a drying line, and the mother liquor is returned to the stage of the process in which it is supplemented e.g. with quantities corresponding to the material losses of the raw materials, possibly in the form of solutions, preferably preheated, after which the mixture is concentrated possibly in underpressure, cooled down and brought to the separation stage again. The salt products in question do not form any boiler scale like crusts on the walls of the concentration apparatus, and they are thus well suited for the described process.

One method for preparing the food salt product according to the invention is solid state processing, in which an alkaline earth metal chloride or chlorides and ammonium chloride are brought together in a solid state, possibly together with sodium chloride and/or potassium chloride. To increase the contact surface of the crystals, the mixture is agitated, ground or pulverized e g. in a bead mill, ball mill, or the like, possibly in a continuous process. If necessary, the fineground product is allowed to hydrate under normal conditions, after which the product is e.g. granulated, when desired.

The nutritional salt product according to the invention is intended to reduce the daily intake of sodium, whose quantity is considerably high, particularly when industrially prepared and packed foodstuffs are used in Western countries. On the other hand, the food salt product is intended to eliminate possible deficiencies of potassium and magnesium, of which minerals particularly the former has an unquestionable effect reducing the blood pressure. Both of the minerals are primarily intracellular, wherein their need is the greatest during pregnancy, adolescence, sports training, or another stress.

The components of the physiological salt product of the invention, correcting salting defects in food, can be proportioned within certain limits, for example according to the embodiment examples to be presented hereinbelow, taking into account the new upper limit for the content of potassium chloride set by the Scientific Committee for Food of the EC Commission, which is less than 30 wt-% of the total salt content of the product and which takes into account possible potassium intolerance caused by renal failure.

To evaluate the medical properties of a salt formulation according to the invention, a test of 5 days was made on five healthy young persons. In the food consumed by the test persons, salt with the following formula was systematically added instead of sodium chloride:

29% NaCl

36% KCl

35% $MgNH_4Cl_3 \times 6H_2O$

As a result of the test, it was found that the above-described salt product was absorbed intestinally without side effects and caused a decrease in the average urinal sodium content from the level of 114.8 mmol/l ($\delta 41.0$) to the level of 50.4 mmol/l ($\delta 32,9$) and, correspondingly, an increase in the magnesium content from the level of 4.50 mmol/l ($\delta 1.78$) to the level of 5.48 mmol ($\delta 2.82$). Furthermore, it was significant in the results that the average systolic blood pressure of the test persons decreased from the level of 112.2 mmHg ($\delta 10.8$) to the level of 105.6 mmHg ($\delta 6.99$). In the above values, 5 indicates standard deviation.

The following examples describe the technique relating to the invention and some typical salt formulations according to the invention.

In the examples on preparing alkaline earth metal components, for characterizing the products, the following analytical methods are used:

| | |
|---|---|
| Mg | complexometric, EDTA |
| $NH_4$ | Kjeldahl method |
| Cl | $AgNO_3$, adsorption indicator |

The pH of the products is determined from a 2% aqueous solution.

EXAMPLE 1

This example describes the dependence of the properties of ammonium carnallite as the product on the concentration of the mother liquor.

a) 1.0 mol (53.5 g) of ammonium chloride was dissolved in 100 ml of water, with heating. The obtained solution was added by mixing to a heated solution which contained 1.0 mol (203.3 g) of the compound $MgCl_2 \times 6H_2O$ dissolved in 50 ml of water. The obtained mixture was cooled, filtered by suction, and dried.

Yield: 124.4 g (48.5%) of the compound $MgNH_4Cl_3 \times 6H_2O$ Upon evaporation of the mother liquor obtained as a filtrate to half of its original volume, 63.3 g of the same compound was obtained.

Total yield: 188.2 g/173.3%), pH 5.27

| Analytical values for the product: | Mg | 8.57% |
|---|---|---|
| | $NH_4$ | 8.96% |
| | Cl | 43.8% |

The product contains some coprecipitated ammonium chloride.

b) 1.0 mol (53.5 g) of ammonium chloride and 1.0 mol (203.3 g) of the compound $MgCl_2 \times 6H_2O$ were added to 100 ml of water. The mixture was boiled refluxed to complete the solubility and allowed to cool down. The separated crystal mass was filtered by suction and dried.

Yield: 151.2 g (59.0%), white crystal mass with a pleasant, slightly acid taste.

pH of the product 5.34

| Analytical values for the product: | $NH_4$ | 7.23% |
|---|---|---|
| | Mg | 9.12% |

Taking into account the error limits of the analysis methods, the product has a composition corresponding to the structural formula $MgNH_4Cl_3 \times 6H_2O$.

EXAMPLE 2

1.0 mol (53.5 g) of ammonium chloride was dissolved by heating to 100 ml of water. When the temperature was 60° C., 1.0 mol (219.0 g) of the compound $CaCl_2 \times 6H_2O$ was added to the mixture. The mixture was cooled, filtered by suction, and dried.

Yield: 110.5 g (40.8%) of hydrate forms of calcium ammonium chloride When the mother liquor was evaporated to the halt of its original volume, 56.5 g of the same product was obtained.

Total yield: 167.0 g (61.7%) Analysis: Ca 15.3%

EXAMPLE 3

The aim of the example is to describe such a unit process method for preparing ammonium carnallite, in which it is desired to give the product a higher pH value than the product of example 1b).

However, the process of example 1b) was repeated in that 2.5 ml of 5% ammonium hydroxide was added to the mother liquor. The easily filtratable crystal mass was separated from the mother liquor by suction, and the obtained product was dried at a temperature of 60° C.

Yield: 151.3 g (58.9%) of cubical crystals and their agglomerates with a pleasant salty taste.

The pH of the product was 5.83 and the analytical values were:

| The pH of the product was 5.83 and the analytical values were: | |
|---|---|
| $NH_4$ | 7.50% |
| Mg | 9.26% |

EXAMPLE 4

The aim of the example is to describe a process of preparing ammonium carnallite in an advantageous manner in industrial scale, in which it is desired to give the product a higher pH than the value of example 3.

107.0g (2.0 mol) of ammonium chloride and 406.6 g (2.0 mol) of the compound $MgCl_2 \times 6H_2O$ were dissolved by heating to 450 ml of water which contained 10 ml of 5% ammonium hydroxide. The solution was concentrated in underpressure by means of a rotary evaporator until the quantity of distilled water was 290 ml. The separated crystal mass was filtered by suction, dried at room temperature, and the filtrate was recovered to be re-used.

Yield: 345.5 g (61%) of a crystal mass with a pleasant salty taste.

The pH of the product was 6.18 and the analytical values were:

| The pH of the product was 6.18 and the analytical values were: | |
|---|---|
| $NH_4$ | 7.32% |
| Mg | 9.23% |

EXAMPLE 5

The example describes a situation in which a hygroscopic component is coprecipitated to the ammonium carnallite to be prepared. The product obtained is a calcium-containing non-hygroscopic sprinklable salt component.

53.5 g (1.0 mol) of ammonium chloride, 203.3 g (1.0 mol) of the compound $MgCl_2 \times 6H_2O$ and 21.9 g (0.1 mol) of the compound $CaCl_2 \times 6H_2O$ were dissolved by heating to 225 ml of water which contained 5 ml of 5% ammonium hydroxide. The solution was concentrated in underpressure by means of a rotary evaporator until the quantity of the distillate was 145 ml. The separated crystal mass was filtered under suction and dried at a temperature of 70° C.

Yield: 184.2 g (66% of the starting materials) of a white crystal mass with a wide salty taste. The pH of the product was 6.44, and the analytical values were:

| $NH_4$ | 6.84% |
|---|---|
| Cl | 41.60% |
| Mg | 8.52% |
| Ca | 1.47% |

EXAMPLE 6

The example describes a situation in which a synthetically formed salt corresponding to natural potassium carnallite is combined with ammonium carnallite, and a non-hygroscopic carnallite mixture is obtained with an exceptionally low $NH_4$ content.

a) 53.5 g (1.0 mol) of ammonium chloride, 74.5 g (1.0 mol) of potassium chloride, and 406.6 g (2.0 mol) of the compound $MgCl_2 \times 6H_2O$ were dissolved by heating into 450 ml of water which contained 5 ml of 5% ammonia solution. The solution was concentrated in underpressure with a rotary evaporator until the quantity of the distillate was 265 ml. The separated crystal mass was filtered by suction and dried at a temperature of 70° C.

Yield: 390.5 g (73%) of a white crystal mass with a light salty taste.

The pH of the product was 6.10, and the analytical values were:

| | |
|---|---|
| $NH_4$ | 3.55% |
| Mg | 8.53% |
| Cl | 40.4% |

Taking into account the error limits of the analysis methods, the product corresponds relatively well to the structural formula $MgCl_2 \times 0.5\ NH_4Cl \times 0.5\ KCl \times 6H_2O$.

b) 26.8 g (0.5 mol) of ammonium chloride, 37.3 g (0.5 mol) of potassium chloride and 203.3 g (1.0 mol) of the compound $MgCl_2 \times 6H_2O$ were dissolved by heating into 230 ml of water which contained 2.5 ml of 5% ammonia solution. To the solution was added the filtrate (165 ml) from the embodiment example 6a, after which the solution was concentrated in underpressure by a rotary evaporator until the quantity of the distillate was 240 ml. The separated crystal mass was filtered by suction and dried at a temperature of 65° C.

Yield: 320.5 g (78%) of a salt product with a pleasant taste.

The pH of the product was 5.94, and the analytical values were:

| | |
|---|---|
| $NH_4$ | 3.45% |
| Mg | 9.10% |
| Cl | 39.9% |

Taking into account the error limits of the analysis methods, the product corresponds very well to the structural formula $MgCl_2 \times 0.5\ NH_4Cl \times 0.5\ KCl \times 6H_2O$.

EXAMPLE 7

This example describes a situation in which an organic complex is formed of alkaline earth ammonium chloride to have a particularly good absorption capacity.

53.5 g (1.0 mol) of ammonium chloride, 75.1 g (1.0 mol) of glycine, and 219.1 g (1.0 mol) of the compound $CaCl_2 \times 6H_2O$ were dissolved by heating into 200 ml of water. The solution was concentrated to almost dry state in underpressure by means of a rotary evaporator. The moist crystal mass was carefully dried in a microwave oven.

Yield: 257.2 g of a white crystal mass of small particles corresponding to the formula $CaNH_4Cl_3 \times Gly \times H_2O$. The product had a slightly sweet, salty taste. Its pH was 5.47, and the analytical values were:

| | |
|---|---|
| $NH_4$ | 6.73% |
| Ca | 15.35% |
| Cl | 40.13% |

EXAMPLE 8

The example describes a typical Na/K/Mg food salt formulation according to the invention. The middle column shows the amount of the material in milliequivalents with an assumed daily salt intake of 10 g, and the right-hand column shows the daily dose of the corresponding ion in milligrams. The new recommendation on the maximum content of potassium chloride, less than 30 wt-%, is taken into account in the formulation.

| | wt - % | mmol | mg |
|---|---|---|---|
| NaCl | 36 | 61.6 | 1420 |
| KCl | 29 | 38.9 | 1520 |
| $MgNH_4Cl_3 \times 6H_2O$ | 35 | 13.6 | 330 |

When the mmol and mg values of the above table are compared with the RDA values of magnesium presented in the introduction of the invention, it can be stated that the physiological objectives set for the invention can be achieved. Thus, the content of magnesium salt in the food salt formulation containing a chloride of sodium and/or potassium is advantageously at least 2.5 wt-%, preferably at least 3.0 wt-%, calculated as magnesium.

EXAMPLE 9

The example describes a typical calcium-containing Na/K/Mg food salt product in which the ratio of magnesium and calcium is close to the corresponding average value in sea water. In this example, calcium is present in an easily absorbable complex form. The references in the table are the same as in example 8.

| | wt - % | mmol | mg |
|---|---|---|---|
| NaCl | 30 | 51.3 | 1180 |
| KCl | 29 | 38.9 | 1520 |
| $MgNH_4Cl_3 \times 6H_2O$ | 35 | 13.6 | 330 |
| $CaNH_4Cl_3 \times Gly \times H_2O$ | 6 | 2.33 | 93 |

EXAMPLE 10

The example describes a typical N/k/Mg food salt product in which the $NH_4$ content is made exceptionally low by using a mixed form of ammonium and potassium camallites as the alkaline earth metal component, prepared in mole ratios of 1:1. The references in the table are the same as in the previous examples.

|  | wt - % | mmol | mg |
|---|---|---|---|
| NaCl | 38 | 65.0 | 1495 |
| KCl | 24 | 32.2 | 1260 |
| $MgCl_2 \times 0.5\ NH_4Cl \times 0.5\ KCl \times 6H_2O$ | 38 | 14.2 | 345 |

In the, example formulation, the content of potassium chloride is reduced, because the carnallite mixture contains 7.1 mmol of potassium. Thus, the total content of KCl becomes 39.3 mmol, which corresponds in the formulation to the percentual content of 29.3% of KCl, which is less than the present recommendation limit of 30%.

What is claimed is:

1. A physiological food salt product including an alkaline earth metal component, the product comprising:
   at least one hydrate form having the general formula $MNH_4Cl_3 \times XH_2O$, wherein M represents Mg or Mg and Ca and X represents the number of molecules of water of crystallization and is in the range of 4 to 6, and
   at least one of sodium chloride and potassium chloride.

2. The product according to claim 1, whrerein the hydrate is in a complex form.

3. The product according to claim 1, wherein the general anhydrous formula of the salt contained in the product is $aMg \times bCa \times NH_4Cl_3$, in which $a+b=1$, and a and b are greater than 0, and in which part of the ammonium can be replaced with potassium.

4. The product according to claim 1, wherein the general anhydrous formula of the salt contained in the product has the formula $MgNH_4Cl_3 \times eCaCl_2$.

5. The product according to claim 4, wherein e is not greater than 0.2 and part of the ammonium is replaced with potassium.

6. The product according to claim 1, wherein the general anhydrous formula of the salt contained in the product is $Mg \times cNH_4 \times dK \times Cl_3$, in which $c+d=1$, and c and d are greater than 0.

7. The product according to claim 6, wherein $c \geq 0.5$.

8. The product according to claim 1, wherein the content of said hydrate of said general formula in the mixture is at least 2.5 wt-%, calculated as magnesium.

9. The product according to claim 8, wherein the content of said hydrate of said general formula in the mixture is at least 3.0 wt-%, calculated as magnesium.

10. The product according to claim 1, further comprising: materials which are advantageous to vital functions.

11. The product according to claim 10, wherein the materials that are advantageous to vital functions comprise at least one of micronutrients, vitamins, flavonoids, and steroids.

12. A physiological food salt product including an alkaline earth metal component, the product comprising:
   at least one hydrate form having the general formula $MNH_4Cl_3 \times XH_2O$, wherein M represents Mg or Mg and Ca and X represents the number of molecules of water of crystallization and is in the range of 4 to 6, and further comprising:
   additives affecting primarily the taste of the product that comprise at least one of carbohydrates, polymeric forms of carbohydrates, spices, herbs, acidity regulators, glutamates, proteins, and protein hydrolysates.

13. A nutrient substance, a semi-finished product, a processed food product, a food portion, wherein a food salt product including magnesium ammonium chloride of the general formula:
   $MNH_4Cl_3 \times XH_2O$, wherein M represents Mg or Mg and Ca and X represents the number of molecules of water of crystallization and is in the range of 4 to 6
   has been used, in solid form or in a solution, in at least one of processing and preservation of the nutrient substance, semi-finished product, processed food product, or food portion.

14. A method for preparing a food salt product containing an alkaline earth metal component, wherein an alkaline earth metal chloride and ammonium chloride are brought together in a solution form, wherein a precipitate is formed which contains one or several hydrate forms of an alkaline earth metal ammonium chloride, having the general formula of $MNH_4Cl_3 \times XH_2O$, wherein M represents Mg or Mg and Ca and X represents the number of molecules of water of crystallization and is in the range of 4 to 6, and the obtained precipitate is separated from the mother liquor,
   the solution form containing both magnesium chloride and calcium chloride to include calcium in the product.

15. The method according to claim 14, wherein the precipitation is performed in a continuous process, returning the mother liquor after the separation of the precipitate to the stage in which it is supplemented with the alkaline earth metal chloride and ammonium chloride.

16. A method for preparing a food salt product containing an alkaline earth metal component, wherein an alkaline earth metal chloride and ammonium chloride are brought together in a solution form, wherein a precipitate is formed which contains one or several hydrate forms of an alkaline earth metal ammonium chloride, having the general formula of $MNH_4Cl_3 \times XH_2O$, wherein M represents Mg or Mg and Ca and X represents the number of molecules of water of crystallization and is in the range of 4 to 6, and the obtained precipitate is separated from the mother liquor,
   the solution form including KCl.

17. A method for preparing a food salt product containing an alkaline earth metal component, wherein an alkaline earth metal chloride and ammonium chloride are brought together in a solution form, wherein a precipitate is formed which contains one or several hydrate forms of an alkaline earth metal ammonium chloride, having the general formula of $MNH_4Cl_3 \times XH_2O$, wherein M represents Mg or Mg and Ca and X represents the number of molecules of water of crystallization and is in the range of 4 to 6, and the obtained precipitate is separated from the mother liquor, and
   the pH of the mother liquor is adjusted by means of a hydroxide.

18. The method according to claim 17, wherein the hydroxide is potassium or ammonium hydroxide.

19. The method according to claim 17, wherein the pH of the mother liquor is adjusted to prevent premature crystallization of free ammonium chloride.

* * * * *